(12) United States Patent
Kadgaonkar et al.

(10) Patent No.: US 10,413,889 B2
(45) Date of Patent: Sep. 17, 2019

(54) COMPOSITION AND PROCESS FOR PREPARATION OF CRACKING CATALYST SUITABLE FOR ENHANCING YIELDS OF LIGHT OLEFINS

(71) Applicant: Indian Oil Corporation Limited, Mumbai (IN)

(72) Inventors: Mahesh Kadgaonkar, Faridabad (IN); Biswanath Sarkar, Faridabad (IN); Alex Cheru Pulikottil, Faridabad (IN); Velusamy Chidambaram, Faridabad (IN); Arumugam Velayutham Karthikeyani, Faridabad (IN); Mohan Prabhu Kuvettu, Faridabad (IN); Shiba Prasad Choudhury, Faridabad (IN); Jayaraj Christopher, Faridabad (IN); Brijesh Kumar, Faridabad (IN); Biswapriya Das, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 174 days.

(21) Appl. No.: 15/237,157

(22) Filed: Aug. 15, 2016

(65) Prior Publication Data
US 2017/0144139 A1 May 25, 2017

(30) Foreign Application Priority Data
Nov. 24, 2015 (IN) .......... 4402/MUM/2015

(51) Int. Cl.
| | |
|---|---|
| *B01J 29/06* | (2006.01) |
| *B01J 29/80* | (2006.01) |
| *B01J 29/65* | (2006.01) |
| *B01J 29/18* | (2006.01) |
| *B01J 29/08* | (2006.01) |
| *B01J 37/10* | (2006.01) |
| *B01J 37/00* | (2006.01) |
| *B01J 35/00* | (2006.01) |
| *B01J 37/28* | (2006.01) |
| *B01J 35/02* | (2006.01) |
| *B01J 35/08* | (2006.01) |
| *B01J 29/48* | (2006.01) |
| *C10G 11/05* | (2006.01) |
| *C10G 11/18* | (2006.01) |
| *B01J 29/40* | (2006.01) |
| *B01J 29/70* | (2006.01) |

(52) U.S. Cl.
CPC .......... *B01J 29/80* (2013.01); *B01J 29/08* (2013.01); *B01J 29/18* (2013.01); *B01J 29/48* (2013.01); *B01J 29/65* (2013.01); *B01J 35/002* (2013.01); *B01J 35/023* (2013.01); *B01J 35/026* (2013.01); *B01J 35/08* (2013.01); *B01J 37/0009* (2013.01); *B01J 37/0045* (2013.01); *B01J 37/10* (2013.01); *B01J 37/28* (2013.01); *C10G 11/05* (2013.01); *C10G 11/18* (2013.01); *B01J 29/40* (2013.01); *B01J 29/7007* (2013.01); *B01J 2229/186* (2013.01); *B01J 2229/36* (2013.01); *B01J 2229/42* (2013.01)

(58) Field of Classification Search
CPC ........ B01J 29/80; B01J 29/7007; B01J 29/40; B01J 29/65; B01J 29/08; B01J 29/18; B01J 2229/36; B01J 2229/42; B01J 37/0009; B01J 37/28; B01J 37/37; B01J 37/10; B01J 37/0045; B01J 35/002; B01J 35/023; B01J 35/026; B01J 35/08
USPC ...................... 502/63, 64, 67, 68, 69, 70, 71
See application file for complete search history.

(56) References Cited

U.S. PATENT DOCUMENTS

| | | |
|---|---|---|
| 3,758,403 A | 9/1973 | Rosinski et al. |
| 4,309,280 A | 1/1982 | Rosinski et al. |
| 4,522,705 A | 6/1985 | Chu et al. |
| 4,784,745 A | 11/1988 | Nace |
| 4,803,185 A | 2/1989 | Miller et al. |
| 4,828,679 A | 5/1989 | Cormier, Jr. et al. |
| 4,927,523 A | 5/1990 | Donnelly |
| 4,927,526 A | 5/1990 | Anderson et al. |
| 4,983,276 A | 1/1991 | Absil et al. |
| 4,997,545 A | 3/1991 | Krishna et al. |
| 5,039,640 A | 8/1991 | Absil et al. |
| 5,220,089 A | 6/1993 | Le et al. |
| 5,234,575 A | 8/1993 | Haag et al. |
| 5,243,121 A | 9/1993 | Madon et al. |
| 5,302,567 A | 4/1994 | Miller et al. |
| 5,779,882 A | 7/1998 | Chester et al. |
| 5,997,728 A | 12/1999 | Adewuyi et al. |
| 6,156,947 A | 12/2000 | Vora |
| 6,566,293 B1 | 5/2003 | Vogt et al. |
| 6,613,710 B2 | 9/2003 | Ray et al. |
| 6,677,263 B2 | 1/2004 | Wang et al. |
| 6,858,556 B2 | 2/2005 | Kuvettu et al. |

(Continued)

*Primary Examiner* — Elizabeth D Wood
(74) *Attorney, Agent, or Firm* — Snell & Wilmer L.L.P.

(57) ABSTRACT

The present invention relates to a fluid catalytic cracking additive composition for cracking of heavy hydrocarbon feed stocks and process for preparing the additive. The additive is suitable for enhancing yields of light olefins such as propylene, isobutylene, LPG and reduces the bottom yields. The invention specifically relates to a fluid catalytic cracking additive composition comprising a pentasil zeolite, zeolites having pore size in a range of 5.4-7.7 Å, alumina, colloidal silica, kaolin clay, and phosphate, wherein the zeolites having pore size in the range of 5.4-7.7 Å is present in an amount of 1 to 10 wt % with respect to the total amount of the pentasil zeolite and zeolite having the pore size in the range of 5.4-7.7 Å.

6 Claims, No Drawings

(56) References Cited

U.S. PATENT DOCUMENTS

| | | |
|---|---|---|
| 7,517,827 B2 | 4/2009 | Ravichandran et al. |
| 2013/0023710 A1* | 1/2013 | Ravichandran ...... B01J 35/0006 585/639 |
| 2014/0116923 A1* | 5/2014 | Dinda ..................... B01J 29/80 208/120.25 |
| 2016/0216242 A1* | 7/2016 | Ravichandran .......... B01J 29/40 |

* cited by examiner

COMPOSITION AND PROCESS FOR PREPARATION OF CRACKING CATALYST SUITABLE FOR ENHANCING YIELDS OF LIGHT OLEFINS

CROSS-REFERENCE TO RELATED APPLICATIONS

This patent application claims priority pursuant to 35 U.S.C. § 119(b) and 37 CFR 1.55(d) to Indian Patent Application No. 4402/MUM/2015, filed Nov. 24, 2015, which application is incorporated herein in its entirety by reference.

FIELD OF THE INVENTION

The present invention relates to a catalyst composition for use in a catalytic cracking process. More particularly, the present invention provides Fluid Catalytic Cracking Additive composition for cracking of heavy petroleum feed for enhancing yield of olefins such as propylene, LPG and iso-butylenes and has propylene selectivity up to 12 wt %, LPG selectivity up to 28 wt % and iso-butylene selectivity up to 5 wt %. The invention specifically relates to a fluid catalytic cracking additive composition comprising a pentasil zeolite, zeolites having pore size in a range of 5.4-7.7 Å, alumina, colloidal silica, kaolin clay and phosphate, wherein the zeolites having pore size in the range of 5.4-7.7 Å is present in an amount of 1 to 10 wt % with respect to the total amount of the pentasil zeolite and zeolite having pore size in the range of 5.4-7.7 Å. The present invention also relates to a process for preparing the fluid catalytic cracking additive composition and manner of use thereof.

BACKGROUND OF THE INVENTION

Catalysts used in FCC processes are in particle form, usually have an average particle size in the range of 20 to 200 microns, and circulate between a cracking reactor and a catalyst regenerator. In the reactor, hydrocarbon feed contacts hot, regenerated catalyst which vaporizes and cracks the feed at about 400° C. to 700° C., usually 500° C. to about 550° C. The cracking reaction deposits carbonaceous hydrocarbons or coke on the catalyst, thereby deactivating it. The cracked products are separated from the coked catalyst. The coked catalyst is stripped of volatiles, usually with steam, in a catalyst stripper and then regenerated. The catalyst regenerator burns coke from the catalyst with oxygen containing gas, usually air, to restore catalyst activity and heat catalyst to, e.g., 500° C. to 900° C., usually 600° C. to 750° C. The hot regenerated catalyst recycles to the cracking reactor to crack more fresh feed. Flue gas from the regenerator may be treated to remove particulates or convert CO, and then discharged into the atmosphere. The FCC process, and its development, is described in the Fluid Catalytic Cracking Report, Amos A. Avidan, Michael Edwards and Hartley Owen, in the Jan. 8, 1990 edition of the Oil & Gas Journal.

The product distribution from current FCC processes comprises a number of constituents, with gasoline being of primary interest to most refiners. Light olefins and LPG are also found in the FCC product, and are increasingly becoming of interest to refiners as those products become more valuable. The light olefins produced can be used for a number of purposes, e.g., they are upgraded via sulfuric or HF alkylation to high quality alkylate. LPG is used for cooking and/or heating purposes. Accordingly, operators of FCC units can vary the content of their products depending upon the markets they are serving and the value associated with each of the components found in an FCC product.

Propylene is a particular light olefin in high demand. It is used in many of the world's largest and fastest growing synthetic materials and thermoplastics. Refiners are relying more and more on their FCC units to meet the increased demand for propylene, thus shifting the focus of the traditional FCC unit away from transportation fuels and more toward petrochemical feedstock production as operators seek opportunities to maximize margins.

If a refinery cannot expand its existing unit, FCC operators have rather limited options for increasing light olefin production. Reported options include:

a. FCC processes employing ZSM-5 and large pore zeolite that share matrix, i.e., an integral catalyst.
b. FCC processes using additive ZSM-5 catalyst.
c. Production of cracked gas from gas oil over pentasil zeolites at high cracking severity.

U.S. Pat. No. 3,758,403 discloses adding ZSM-5 to conventional large pore zeolite cracking catalyst formulations, including adding ZSM-5 during manufacture of the large pore zeolite catalyst particles so that the ZSM-5 is integrated into the catalyst particle. Based on U.S. Pat. No. 3,758,403, use of large pore zeolite cracking catalyst containing large amounts of ZSM-5 additive that has been integrated into the catalyst gives only modest increases in light olefin production. A 100% increase in ZSM-5 content (from 5 wt % ZSM-5 to 10 wt % ZSM-5) increased the propylene yield less than 20%, and decreased slightly the potential gasoline yield.

U.S. Pat. No. 6,566,293 discloses another type of integral catalyst wherein phosphorus is combined with the ZSM-5 and calcined prior to their addition to matrix, and optionally, and in certain instances, preferably large pore zeolite Y. The resulting slurry of calcined ZSM-5/phosphorus and matrix-containing slurry is then spray dried into catalyst. The U.S. Pat. No. 6,566,293 patent reports that these catalysts are efficient in olefins production, while also maintaining bottoms cracking. See also "FCC Meets Future Needs", Hydrocarbon Engineering, January 2003.

U.S. Pat. No. 7,517,827 discloses a process for preparation of LPG selective catalyst particles comprising a medium pore low soda zeolite bonded with clay-phosphate-silica-alumina binder. The catalyst suitable for cracking heavy residual hydrocarbon feeds.

US 2013/0023710 A1 discloses a FCC additive preparation process and composition, which has high efficiency in the production of light olefins C2, C3 and C4 hydrocarbons, specifically propylene and it also discloses the stabilization of medium pore zeolite specifically ZSM-5 using optimum phosphate salts at a pH in the range 7-9 with synergetic combination of silica rich binder to produce FCC additive having excellent stability under severe hydrothermal conditions.

U.S. Pat. No. 6,858,556 teaches the preparation of stabilized dual zeolite in a single particle catalyst composition consisting of 5% ZSM-5 and 12% REY using conventional silica-alumina binder for cracking of heavier hydrocarbons into lighter products.

Following patents i.e., U.S. Pat. Nos. 5,220,089, 5,243,121, 6,156,947, 4,309,280, 4,803,185, 4,522,705, 4,784,745, 4,828,679, 4,927,523, 4,927,526, 4,983,276, 4,997,545, 5,039,640, 5,302,567, 5,779,882, 5,997,728, 6,613,710, 6,677,263, 5,234,575 illustrate prior art processes and compositions which are different from present invention with respect to FCC composition, process and performance.

The available prior art compositions though possess catalytic properties but there is always a need to produce improved catalyst additives that are capable of producing enhanced yields of liquefied petroleum gas and light olefins as compared to the available conventional catalyst compositions.

OBJECTIVE OF THE INVENTION

The increase in the number of refineries wishing to obtain propylene yields significantly above 10 wt. % and LPG yields above 30 wt. % poses a new challenge for existing catalyst technology, as these yields typically cannot be achieved with currently available ZSM-5 additives. Excessive amounts of ZSM-5 based additive in the FCC catalyst inventory have been shown to dilute the base catalyst activity and reduce unit conversion.

An objective of this invention is to develop a catalyst where the cracking function is modified through the inclusion of additives for cracking function that ultimately converts gasoline range hydrocarbons to light olefins, e.g., propylene, isobutylene and LPG.

More particularly, the present invention relates to a process for the preparation of isobutylene selective catalyst particles comprising a medium pore pentasil zeolite in combination with zeolite having pore size in the range of 5.4-7.7 Å such as beta, mordenite, ferrirete zeolite which are bonded with clay-phosphate-silica-alumina binder.

In the said catalyst, a dual zeolites combination chosen in a composition window as defined in the invention results in a synergistic improvement light olefins predominantly yields of iso-butylenes in total $C_4$ olefins rather than an additive effect as shown in the prior art.

SUMMARY OF THE INVENTION

Accordingly, the present invention provides a fluid catalytic cracking additive composition comprising of 1-50 wt % pentasil zeolite, 0.01-5 wt % of zeolite having the pore size in a range of 5.4-7.7 Å, 0-15 wt % alumina, 5-20 wt % colloidal silica; 10-60 wt % kaolin clay; and 5-15 wt % phosphate, with respect to the amount of the fluid catalytic cracking additive composition.

In an embodiment of the present invention, the pentasil zeolite and zeolite having the pore size in the range of 5.4-7.7 Å having the silica alumina ratio ranging from 8 to 500.

In one of the embodiment of the present invention, the zeolites having pore size in the range of 5.4-7.7 Å is present in an amount of 1 to 10 wt % with respect to the total amount of the pentasil zeolite and zeolite having the pore size in the range of 5.4-7.7 Å.

In one of the embodiment of the present invention, the pentasil zeolite is selected from a group comprising of ZSM-5 Zeolite, ZSM-11 Zeolite, ZSM-12 Zeolite, ZSM-22 Zeolite, ZSM-23 Zeolite, and ZSM-35 Zeolite.

In another embodiment of the present invention, the zeolite having pore size in the range of 5.4-7.7 Å is selected from the group comprising of beta zeolite, mordenite zeolite and ferrirete zeolite.

In another embodiment of the present invention, the fluid catalytic cracking additive composition preferably comprises of ZSM-5 and beta zeolite.

In yet another embodiment of the present invention, the fluid catalytic cracking additive composition shaped in the micro-spheroidal particles with average particle size of 80-100 micron has an ABD above 0.75 g/cm$^3$, attrition index below 5.

In yet another embodiment of the present invention, the additive has propylene selectivity up to 12 wt %, LPG selectivity up to 28 wt %, and iso-butylene selectivity up to 5 wt % when used at 5 wt % concentration in base catalyst.

In yet another embodiment of the present invention, the isobutylene selectivity in total C4 is in the range of 35-40%.

The present invention also provides a process for the preparation of fluid catalytic cracking additive composition comprising the following steps:
 a) preparing a slurry of an alumina and peptizing the slurry to form an alumina gel;
 b) preparing a phosphated pentasil zeolite slurry;
 c) dispersing a zeolite having pore size in the range of 5.4-7.7 Å in water to form a zeolite slurry;
 d) preparing a clay-phosphate slurry by adding a slurry of kaolin clay with a source of phosphate;
 e) adding the alumina gel of step (a) with phosphated pentasil zeolite slurry of step (b) and the zeolite slurry of step (c) to the clay-phosphate slurry of step (d) to form alumina-phosphated zeolite-clay-phosphate slurry;
 f) adding colloidal silica to the alumina-phosphated zeolite-clay-phosphate slurry of step (e) to form a catalyst precursor slurry; and
 g) spray drying and calcining the catalyst precursor slurry to obtain the fluid catalytic cracking additive composition.

In one of the embodiment of the present invention, the pentasil zeolite is used in an amount of 1 to 50 wt. % and zeolites having pore size in the range of 5.4-7.7 Å is used in an amount of 0.01 to 5 wt %, with respect to the total amount of ingredient used in preparing the fluid catalytic cracking additive composition.

In an embodiment, the present invention provides the process for the preparation of fluid catalytic cracking additive composition in which the zeolites having pore size in the range of 5.4-7.7 Å is present in an amount of 1 to 10 wt % with respect to the total amount of the pentasil zeolite and zeolite having the pore size in the range of 5.4-7.7 Å.

In one embodiment, the present invention provides the process for the preparation of fluid catalytic cracking additive composition in which the pentasil zeolite is selected from a group comprising of ZSM-5 Zeolite, ZSM-11 Zeolite, ZSM-12 Zeolite, ZSM-22 Zeolite, ZSM-23 Zeolite, and ZSM-35 Zeolite.

In an another embodiment, the present invention provides the process for the preparation of fluid catalytic cracking additive composition in which the zeolite having pore size in the range of 5.4-7.7 Å is selected from the group comprising of beta zeolite, mordenite zeolite and ferrirete zeolite.

In yet another embodiment, the present invention provides the process for the preparation of fluid catalytic cracking additive composition in which the zeolite used to prepare fluid catalytic cracking additive composition preferably comprises ZSM-5 and beta zeolite.

In yet another embodiment, the present invention provides the process for the preparation of fluid catalytic cracking additive composition in which the fluid catalytic cracking additive composition shaped in the micro-spheroidal particles with average particle size of 80-100 micron has an ABD above 0.75 g/cm$^3$, attrition index below 5.

In an another embodiment, the present invention provides the process for the preparation of fluid catalytic cracking additive composition in which the additive has propylene selectivity up to 12 wt %, LPG selectivity up to 28 wt %, and iso-butylene selectivity up to 5 wt % when used at 5 wt % concentration in base catalyst.

In yet another embodiment, the present invention provides the process for the preparation of fluid catalytic cracking additive composition in which the isobutylene selectivity in total C4 is found to be in the range of 35-40%.

DETAILED DESCRIPTION OF THE INVENTION

The catalyst composition of present invention is mainly used for enhancing olefin yield i.e. ethylene, propylene, isobutylene & LPG from heavy hydrocarbon feed stock. The catalyst composition is used to enhance olefin yield during fluid catalytic cracking (FCC). The feedstock includes Coker gasoline, Coker Fuel Oil (CFO), hydro cracker bottom, Vacuum Gas Oil (VGO), Heavy Vacuum Gas Oil (HVGO), Vacuum Residue, Residue Coker Oil (RCO), Once Through Hydrocracker Unit Bottom (OHCUB) and mixtures thereof.

According to the main objective of the invention is to develop a catalyst where the cracking function is modified through the inclusion of additives for cracking function that ultimately converts gasoline range hydrocarbons to light olefins, e.g., propylene, isobutylene and LPG. Unless expressly indicated otherwise, "light olefins" is meant to refer to $C_3$ and $C_4$ olefins.

More specifically, the formulation of this additive composition according to the invention comprises:
 1-50 wt % pentasil zeolite,
 0.01-5 wt % of zeolites having pore size in the range of 5.4-7.7 Å like beta, mordenite, ferrirete zeolite etc.,
 0-15 wt % alumina,
 5-20 wt % colloidal silica,
 10-60 wt % clay and
 5-15 wt % phosphate.

According to the other embodiments of the invention is to develop a process for the preparation of isobutylene selective catalyst particles comprising a medium pore pentasil zeolite in combination with zeolite having pore size in the range of 5.4-7.7 Å like beta, mordenite, ferrirete zeolite etc., which are bonded with clay-phosphate-silica-alumina binder.

In an embodiment of the present invention, the pentasil zeolite selected from a group comprising of ZSM-5 Zeolite, ZSM-11 Zeolite, ZSM-12 Zeolite, ZSM-22 Zeolite, ZSM-23 Zeolite, and ZSM-35 Zeolite.

Further, another objective of the present invention is modification of acid sites of pentasil zeolite prior to incorporation in clay-phosphate binder as well as incorporation of zeolite having pore size in the range of 5.4-7.7 Å in such a way that it can produce predominantly propylene, LPG and iso-butylene.

Thus developed product has ABD above 0.75 g/cm³ & Attrition Index below 5. This additive can be used from 1-20 wt % concentration in the main FCC catalyst. The additive is suitable for enhancing yields of light olefins such as propylene, LPG, iso-butylene and reduces the bottom yields.

Typical methodology to prepare the additive formulation is summarized in Table 2B. The quantities of the raw materials are varied in line with the additive compositions as mentioned in Table 2B.

Pural SB grade alumina (SASOL, Germany) (having loss on ignition of 24 wt %) was made into a slurry with of Demineralised (DM) water. The slurry was peptized with formic acid (85% concentration) to form alumina gel. The required amount of ZSM-5 zeolite (loss on ignition 12 wt %) having silica to alumina molar ratio of 30 was stabilized with Di-ammonium hydrogen phosphate (DAHP). The pH of phosphated zeolite slurry was found to be in the range of 7-8. The beta zeolite (loss on ignition 10 wt %) having silica to alumina molar ratio of 20 was dispersed in to DM water to form a beta zeolite slurry. Further, kaolin clay (having loss on ignition 14.91 wt %) was made into a slurry with DM water and kept under vigorous stirring while ortho-phosphoric acid (concentration 85 wt %) was added. Earlier prepared alumina gel, phosphated zeolite slurry and beta zeolite slurry were added to the clay-phosphate slurry one after another under vigorous stirring. Finally, ammonium polysilicate was added to this alumina-phosphated zeolite-clay-phosphate slurry and was kept under stirring for 1 h to produce final catalyst precursor slurry. The final slurry having a pH of about 2.5 to 3.5 was spray dried in a counter current spray drier having two fluid nozzle. Spray dried product was calcined at 500° C.

Calcined catalyst was impregnated with 3500 ppm of Nickel and 6500 ppm of Vanadium and steam deactivated at 750° C. for 3 h.

Steam deactivated additives were evaluated in an ACE micro reactor employing a resid FCC feed having physical properties shown in Table 1. For performance evaluation, 5 wt % of ZSM-5 additive was mixed with 95 wt % equilibrated RFCC catalysts and conducted reaction at a temperature of 510° C. in ACE MAT unit.

EXAMPLE-1

65.79 gm of Pural SB grade alumina (having loss on ignition of 24 wt %) was made into a slurry with 198 gm of Demineralised (DM) water. The slurry was peptized with 6 gm of formic acid (85% concentration) to form an alumina gel. 83.41 gm of DAHP was dissolved in 512 gm of DM water after that further 284.09 gm of ZSM-5 zeolite (loss on ignition 12 wt %) having silica to alumina molar ratio of 30 was slurred to form phosphated zeolite slurry having pH of 7.8. 552.36 gm of kaolin clay (having loss on ignition 14.91 wt %) was made into a slurry with 662 gm DM water and kept under vigorous stirring while 84.95 gm of ortho-phosphoric acid (concentration 85 wt %) was added. Earlier prepared alumina gel and phosphated zeolite slurry were added to the clay-phosphate slurry one after another under vigorous stirring. Finally 333.33 gm of ammonium polysilicate was added to this alumina-phosphated zeolite-clay-phosphate slurry and was kept under stirring for 1 hr to produce final catalyst precursor slurry. The final slurry having a pH of about 2.6 was spray dried in a counter current spray drier having two fluid nozzle. Spray dried product was calcined at 500° C.

Calcined catalyst showed ABD of 0.76 g/cc and attrition index of 4.3. Calcined catalyst was impregnated with 3500 ppm of Nickel and 6500 ppm of Vanadium and steam deactivated at 750° C. for 3 hours.

Steam deactivated catalyst was evaluated in an ACE micro reactor employing a resid FCC feed having physical properties shown in Table 1. For performance evaluation, 5 wt % of ZSM-5 additive was mixed with 95 wt % equilibrated RFCC catalysts and conducted reaction at a temperature of 510° C. in ACE MAT unit. Physical properties along with performance results are shown in a Table 2A & 2B.

EXAMPLE-2

65.79 gm of Pural SB grade alumina (having loss on ignition of 24 wt %) was made into a slurry with 198 gm of Demineralised (DM) water. The slurry was peptized with 6 gm of formic acid (85% concentration) to form an alumina gel. 83.41 gm of DAHP was dissolved in 300 gm of DM water and gradually added 170.45 gm of ZSM-5 zeolite (loss on ignition 12 wt %) having silica to alumina molar ratio of 30 under stirring to form phosphated zeolite slurry having pH of 7.0. Dispersed 111.12 gm of beta zeolite (loss on ignition 10 wt %) having silica to alumina molar ratio of 20 in 212 gm of DM water to form beta zeolite slurry. 552.36 gm of kaolin clay (having loss on ignition 14.91 wt %) was made into a slurry with 662 gm DM water and kept under vigorous stirring while 84.95 gm of ortho-phosphoric acid (concentration 85 wt %) was added. Earlier prepared alumina gel, phosphated zeolite slurry and beta zeolite slurry were added to the clay-phosphate slurry one after another under vigorous stirring. Finally 333.33 gm of ammonium polysilicate was added to this alumina-phosphated zeolite-clay-phosphate slurry and was kept under stirring for 1 hr to produce final catalyst precursor slurry. The final slurry having a pH of about 3.0 was spray dried in a counter current spray drier having two fluid nozzle. Spray dried product was calcined at 500° C.

Calcined catalyst showed ABD of 0.77 g/cc and attrition index of 4.5. The catalyst was then deactivated and evaluated in ACE MAT unit as mentioned in Example-1. Physical properties along with performance results are shown in a Table 2A & 2B.

EXAMPLE 3

65.79 gm of Pural SB grade alumina (having loss on ignition of 24 wt %) was made into a slurry with 198 gm of Demineralised (DM) water. The slurry was peptized with 6 gm of formic acid (85% concentration) to form an alumina gel. 83.41 gm of DAHP was dissolved in 300 gm of DM water and gradually added 255.68 gm of ZSM-5 zeolite (loss on ignition 12 wt %) having silica to alumina molar ratio of 30 under stirring to form phosphated zeolite slurry having pH of 7.2. Dispersed 27.78 gm of beta zeolite (loss on ignition 10 wt %) having silica to alumina molar ratio of 20 in 100 gm of DM water to form beta zeolite slurry. 552.36 gm of kaolin clay (having loss on ignition 14.91 wt %) was made into a slurry with 662 gm DM water and kept under vigorous stirring while 84.95 gm of ortho-phosphoric acid (concentration 85 wt %) was added. Earlier prepared alumina gel, phosphated zeolite slurry and beta zeolite slurry were added to the clay-phosphate slurry one after another under vigorous stirring. Finally 333.33 gm of ammonium polysilicate was added to this alumina-phosphated zeolite-clay-phosphate slurry and was kept under stirring for 1 hr to produce final catalyst precursor slurry. The final slurry having a pH of about 3.0 was spray dried in a counter current spray drier having two fluid nozzles. Spray dried product was calcined at 500° C.

Calcined catalyst showed ABD of 0.78 g/cc and attrition index of 4.2. The catalyst was then deactivated and evaluated in ACE MAT unit as mentioned in Example-1. Physical properties along with performance results are shown in a Table 2A & 2B.

EXAMPLE-4

65.79 gm of Pural SB grade alumina (having loss on ignition of 24 wt %) was made into a slurry with 198 gm of Demineralised (DM) water. The slurry was peptized with 6 gm of formic acid (85% concentration) to form an alumina gel. 83.41 gm of DAHP was dissolved in 300 gm of DM water and gradually added 269.89 gm of ZSM-5 zeolite (loss on ignition 12 wt %) having silica to alumina molar ratio of 30 under stirring to form phosphated zeolite slurry having pH of 7.0. Dispersed 13.89 gm of beta zeolite (loss on ignition 10 wt %) having silica to alumina molar ratio of 20 in 100 gm of DM water to form beta zeolite slurry. 552.36 gm of kaolin clay (having loss on ignition 14.91 wt %) was made into a slurry with 662 gm DM water and kept under vigorous stirring while 84.95 gm of ortho-phosphoric acid (concentration 85 wt %) was added. Earlier prepared alumina gel, phosphated zeolite slurry and beta zeolite slurry were added to the clay-phosphate slurry one after another under vigorous stirring. Finally 333.33 gm of ammonium polysilicate was added to this alumina-phosphated zeolite-clay-phosphate slurry and was kept under stirring for 1 hr to produce final catalyst precursor slurry. The final slurry having a pH of about 3.1 was spray dried in a counter current spray drier having two fluid nozzles. Spray dried product was calcined at 500° C.

Calcined catalyst showed ABD of 0.77 g/cc and attrition index of 4.1. The catalyst was then deactivated and evaluated in ACE MAT unit as mentioned in Example-1. Physical properties along with performance results are shown in a Table 2A & 2B.

EXAMPLE-5

65.79 gm of Pural SB grade alumina (having loss on ignition of 24 wt %) was made into a slurry with 198 gm of Demineralised (DM) water. The slurry was peptized with 6 gm of formic acid (85% concentration) to form an alumina gel. 83.41 gm of DAHP was dissolved in 512 gm of DM water after that further 277.77 gm of beta zeolite (loss on ignition 10 wt %) having silica to alumina molar ratio of 20 was slurred in it to form phosphated zeolite slurry having pH of 7.0. 552.36 gm of kaolin clay (having loss on ignition 14.91 wt %) was made into a slurry with 662 gm DM water and kept under vigorous stirring while 84.95 gm of ortho-phosphoric acid (concentration 85 wt %) was added. Earlier prepared alumina gel and phosphated zeolite slurry were added to the clay-phosphate slurry one after another under vigorous stirring. Finally 333.33 gm of ammonium polysilicate was added to this alumina-phosphated zeolite-clay-phosphate slurry and was kept under stirring for 1 hr to produce final catalyst precursor slurry. The final slurry having a pH of about 3.1 was spray dried in a counter current spray drier having two fluid nozzles. Spray dried product was calcined at 500° C.

Calcined catalyst showed ABD of 0.71 g/cc and attrition index of 5.1. The catalyst was then deactivated and evaluated in ACE MAT unit as mentioned in Example-1. Physical properties along with performance results are shown in a Table 2A & 2B.

Properties of Feed Employed for Performance Evaluation of Catalyst Prepared Under Examples-1 to 5 is Given Below Table-1:

TABLE 1

| Feed properties | | | |
|---|---|---|---|
| Sr No | Attributes | Unit | Value |
| 1 | Density @ 15° C. | g/cc | 0.887 |
| 2 | Kinematic Viscosity @ 100° C. | Cst | 7.4 |
| 3 | Distillation, D-1160 | | |
| 4 | IBP | ° C. | 162 |

TABLE 1-continued

Feed properties

| Sr No | Attributes | Unit | Value |
|---|---|---|---|
| 5 | 5% | °C. | 267 |
| 6 | 30% | °C. | 370 |
| 7 | 50% | °C. | 409 |
| 8 | 70% | °C. | 457 |
| 9 | Sulphur | wt % | 1.72 |
| 10 | Total N2 | ppm | 860 |
| 11 | CCR | wt % | 3.3 |
| 12 | V | ppm | 23 |
| 13 | Ni | ppm | 9 |
| 14 | Na | ppm | 1.8 |
| 15 | Fe | ppm | 2.4 |

Physicochemical Properties & Performance Data of Additive Prepared as Per Examples 1 to 5 are Given in Table-2 A & 2B

TABLE 2A

Performance results of additive prepared as per examples 1 to 5

| | Base catalyst + 5 wt % Additive of Example-1 | Base catalyst + 5 wt % Additive of Example-2 | Base catalyst + 5 wt % Additive of Example-3 | Base catalyst + 5 wt % Additive of Example-4 | Base catalyst + 5 wt % Additive of Example-5 |
|---|---|---|---|---|---|
| Cat/oil | 4.51 | 4.51 | 4.51 | 4.51 | 4.51 |
| Conversion, 216 | 62.32 | 62.72 | 64.61 | 65.7 | 63.32 |
| Coke | 4.5 | 4.49 | 4.44 | 4.92 | 4.47 |
| DG | 1.94 | 1.74 | 2.01 | 2.33 | 1.43 |
| LPG | 24.23 | 22.42 | 26.78 | 27.65 | 19.7 |
| Propylene | 9.55 | 8.48 | 10.31 | 11.10 | 8.84 |
| iso-butylene | 3.49 | 3.44 | 4.38 | 4.29 | 3.36 |
| Total C4 olefins | 9.57 | 9.27 | 11.13 | 10.83 | 8.83 |
| Gasoline (C5-150) | 22.06 | 23.88 | 21.78 | 22.15 | 26.6 |
| HN (150-220) | 11.10 | 11.10 | 9.60 | 8.61 | 11.13 |
| LCO (220-370) | 16.72 | 17.32 | 16.6 | 16.44 | 18.22 |
| Bottom (370+) | 19.45 | 19.05 | 18.79 | 17.90 | 18.45 |
| iso-butylenes/ C4 olefins | 36.47 | 37.11 | 39.35 | 39.61 | 38.05 |

TABLE 2B

Additive composition and their physical properties

| | Additive Example-1 | Additive Example-2 | Additive Example-3 | Additive Example-4 | Additive Example-5 |
|---|---|---|---|---|---|
| Additive composition | | | | | |
| PSB, wt % | 5 | 5 | 5 | 5 | 5 |
| ZSM-5 Zeolite, wt % | 25 | 15 | 22.5 | 23.75 | 0 |
| Beta Zeolite, wt % | 0 | 10 | 2.5 | 1.25 | 25 |
| Clay, wt % | 47 | 47 | 47 | 47 | 47 |
| DAHP as PO4 | 6 | 6 | 6 | 6 | 6 |
| H3PO4 (as PO4), wt % | 7 | 7 | 7 | 7 | 7 |
| APS, as SiO2 | 10 | 10 | 10 | 10 | 10 |
| Additive Physical properties | | | | | |
| ABD, gm/cc | 0.76 | 0.77 | 0.78 | 0.77 | 0.71 |
| Attrition Index | 4.3 | 4.5 | 4.2 | 4.1 | 5.1 |

The examples 3 & 4 are prepared based on present invention. Performance of the additive prepared under these examples (3 & 4) showed higher selectivity towards light olefins such as LPG, propylene and iso-butylene.

We claim:

1. A fluid catalytic cracking additive composition comprising of 1-50 wt % pentasil zeolite, 0.01-2.5 wt % of zeolite having a pore size in a range of 5.4-7.7 Å, 0-15 wt % alumina, 5-20 wt % colloidal silica; 10-60 wt % kaolin clay; and 5-15 wt % phosphate, with respect to the amount of the fluid catalytic cracking additive composition, wherein the zeolite having pore size in the range of 5.4-7.7 Å is selected from the group consisting of beta zeolite, mordenite zeolite and ferrirete zeolite.

2. The fluid catalytic cracking additive composition of claim 1, wherein the pentasil zeolite and zeolite having the pore size in the range of 5.4-7.7 Å have silica to alumina ratio ranging from 8 to 500.

3. The fluid catalytic cracking additive composition of claim 1 wherein the zeolite having the pore size in the range of 5.4-7.7 Å is present in an amount of 1 to 10 wt % with respect to the total amount of the pentasil zeolite and zeolite having the pore size in the range of 5.4-7.7 Å.

4. The fluid catalytic cracking additive composition of claim 1 wherein the pentasil zeolite is selected from a group consisting of ZSM-5 Zeolite, ZSM-11 Zeolite, ZSM-12 Zeolite, ZSM-22 Zeolite, ZSM-23 Zeolite, and ZSM-35 Zeolite.

5. The fluid catalytic cracking composition of claim 1 wherein the pentasil zeolite is ZSM-5 and the zeolite having the pore size in a range of 5.4-7.7 Å is beta zeolite.

6. The fluid catalytic cracking additive composition of claim 1, wherein the fluid catalytic cracking additive composition is shaped in micro-spheroidal particles having an average particle size of 80-100 micron, an ABD above 0.75 $g/cm^3$, and an attrition index below 5.

* * * * *